United States Patent
Lu et al.

(10) Patent No.: US 8,254,097 B2
(45) Date of Patent: Aug. 28, 2012

(54) MOUNTING APPARATUS FOR PERIPHERAL COMPONENT INTERCONNECT CARD

(75) Inventors: Wen-Hu Lu, Shenzhen (CN); Ya-Ni Zhang, Shenzhen (CN); Yi-Lung Chou, Taipei Hsien (TW); Li-Ping Chen, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 292 days.

(21) Appl. No.: 12/701,691

(22) Filed: Feb. 8, 2010

(65) Prior Publication Data

US 2011/0102994 A1    May 5, 2011

(30) Foreign Application Priority Data

Nov. 3, 2009   (CN) ........................ 2009 2 0313970 U

(51) Int. Cl.
*H05K 7/14*    (2006.01)
(52) U.S. Cl. ................. 361/679.02; 361/732; 312/223.1
(58) Field of Classification Search ............. 361/679.01, 361/679.02, 718, 719, 748, 736, 755, 732; 312/223.1–223.2
See application file for complete search history.

(56) References Cited

U.S. PATENT DOCUMENTS

| 6,671,181 | B2 * | 12/2003 | Kaminski | ...................... 361/759 |
| 7,724,538 | B2 * | 5/2010 | Tsai et al. | ...................... 361/802 |
| 7,898,797 | B2 * | 3/2011 | Fan et al. | ................... 361/679.4 |

* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A mounting apparatus for a PCI card includes a mounting bracket, a securing piece adapted to attach the PCI card to the mounting bracket and a securing member. The mounting bracket has a base and a blocking plate perpendicular to the base. The securing member includes a pressing piece and a securing piece rotatably attached to the pressing piece. The mounting piece includes a mounting end. The securing piece includes a securing portion. The securing piece is capable of engaging with an inside surface of the mounting bracket by rotating the securing piece relative to the pressing piece, thereby sandwiching the mounting end of the securing piece between the blocking plate and the pressing piece.

18 Claims, 6 Drawing Sheets

MOUNTING APPARATUS FOR PERIPHERAL COMPONENT INTERCONNECT CARD

BACKGROUND

1. Technical Field

The disclosure generally relates to mounting apparatuses, especially to a mounting apparatus for a peripheral component interconnect (PCI) card.

2. Description of Related Art

PCI cards are widely used in computers. PCI is a type of bus structure, which is used for connecting modem cards, monitor cards, sound cards or other peripheral equipment. The conventional fixing manner for PCI cards usually involves screws, and installation requires the use a screwdriver, which is time-consuming and troublesome. Moreover, the screws are easily lost. If a screw falls on the printed circuit board (PCB), damage to the PCB may occur, especially when the computer is powered up. Furthermore, as more and more components are installed in the computer, the space in the computer enclosure will be occupied by a mass of electronic components and inserting a screwdriver is troublesome.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
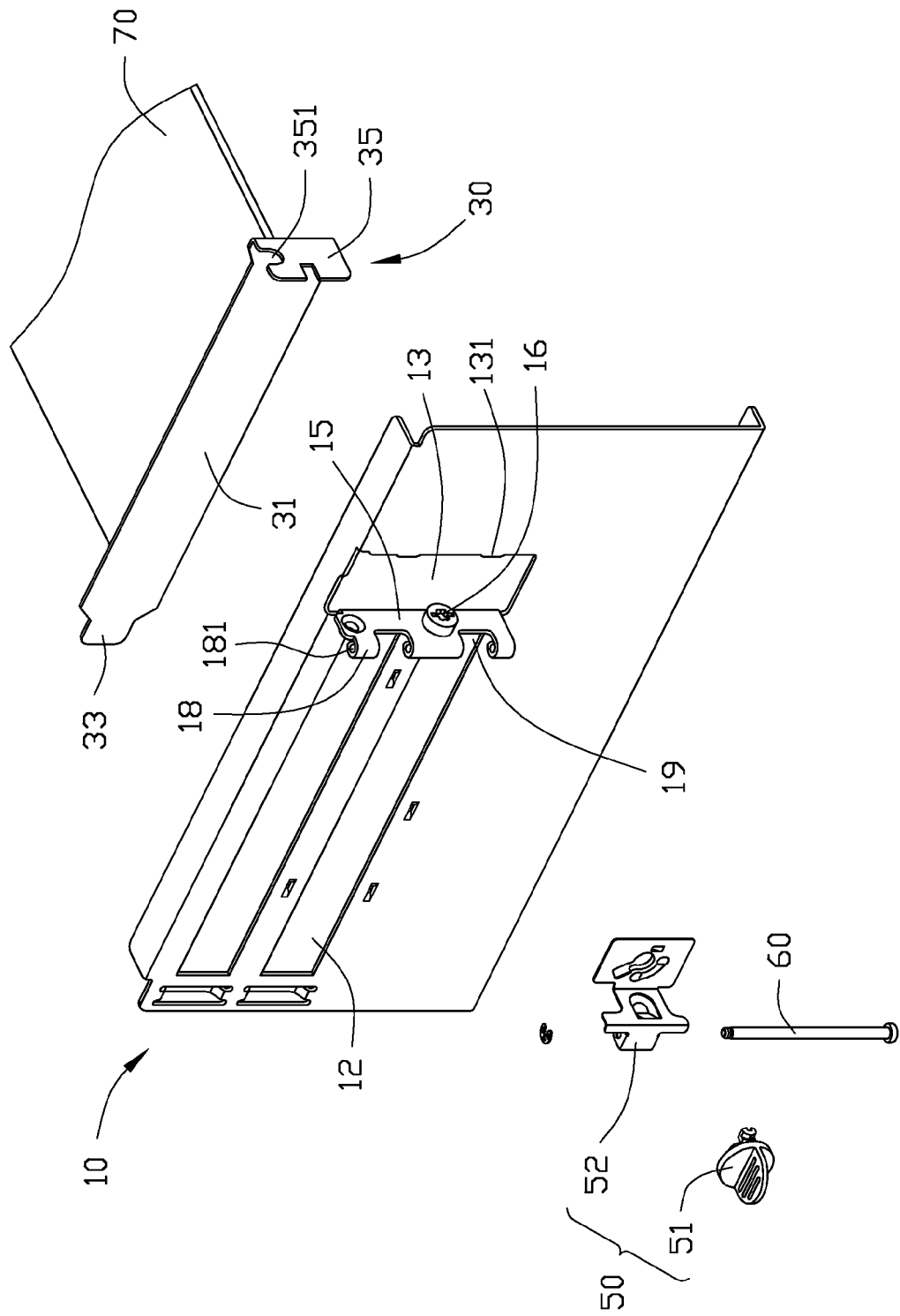
FIG. 1 is an exploded, isometric view of an embodiment of a mounting apparatus for PCI cards.
Figure 2:
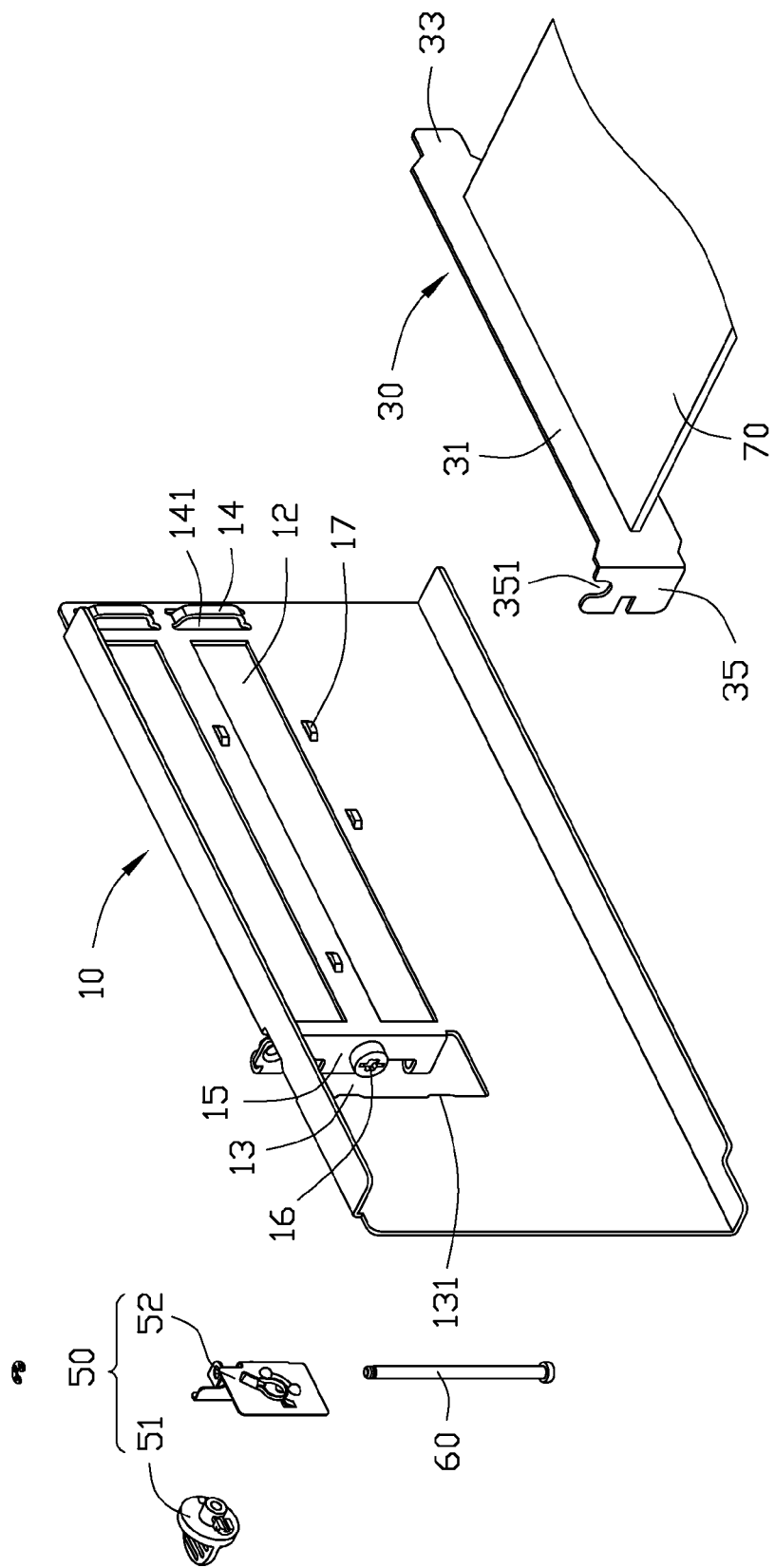
FIG. 2 is similar to FIG. 1, but viewed from another aspect.

Referring to FIGS. 1 and 2, an embodiment of a mounting apparatus for one PCI card 70. The mounting apparatus includes a mounting bracket 10, a securing piece 30 mounted on the PCI cards 70, and a securing member 50 pivotably mounted to the mounting bracket 10.

The mounting bracket includes a rectangular base. Rectangular slots 12 are defined in the base. Bridge portions 14 are formed on the base adjacent to one side of the elongated rectangular slots 12. Each bridge portion defines a securing slot 141. A mounting opening 13 is defined in the base adjacent to the elongated rectangular slots 12. A blocking plate 15, perpendicular to the base, extends from a side edge of the mounting opening 13 adjacent to the elongated rectangular slots 12. A positioning protrusion 16 protrudes from the blocking plate 15. A plurality of pivoting portions 18 is located at a side of the blocking plate 15. Each pivoting portion 18 defines a first pivoting hole 181. A receiving notch 19 is defined between every two adjacent pivoting portions 18. Blocking tabs 131 protrude from the other side edge of the mounting opening 13 opposite to the bent plate 15.

The mounting piece 30 includes an elongated rectangular base 31 configured to cover the corresponding elongated rectangular slot 12, an inserting end 33 extends from one side of the elongated rectangular base 31 configured to insert into the securing slot 141, and a mounting end 35 is disposed on the blocking plate 15. A cutout 351 is defined in an edge of the mounting end 35.

Figure 3:
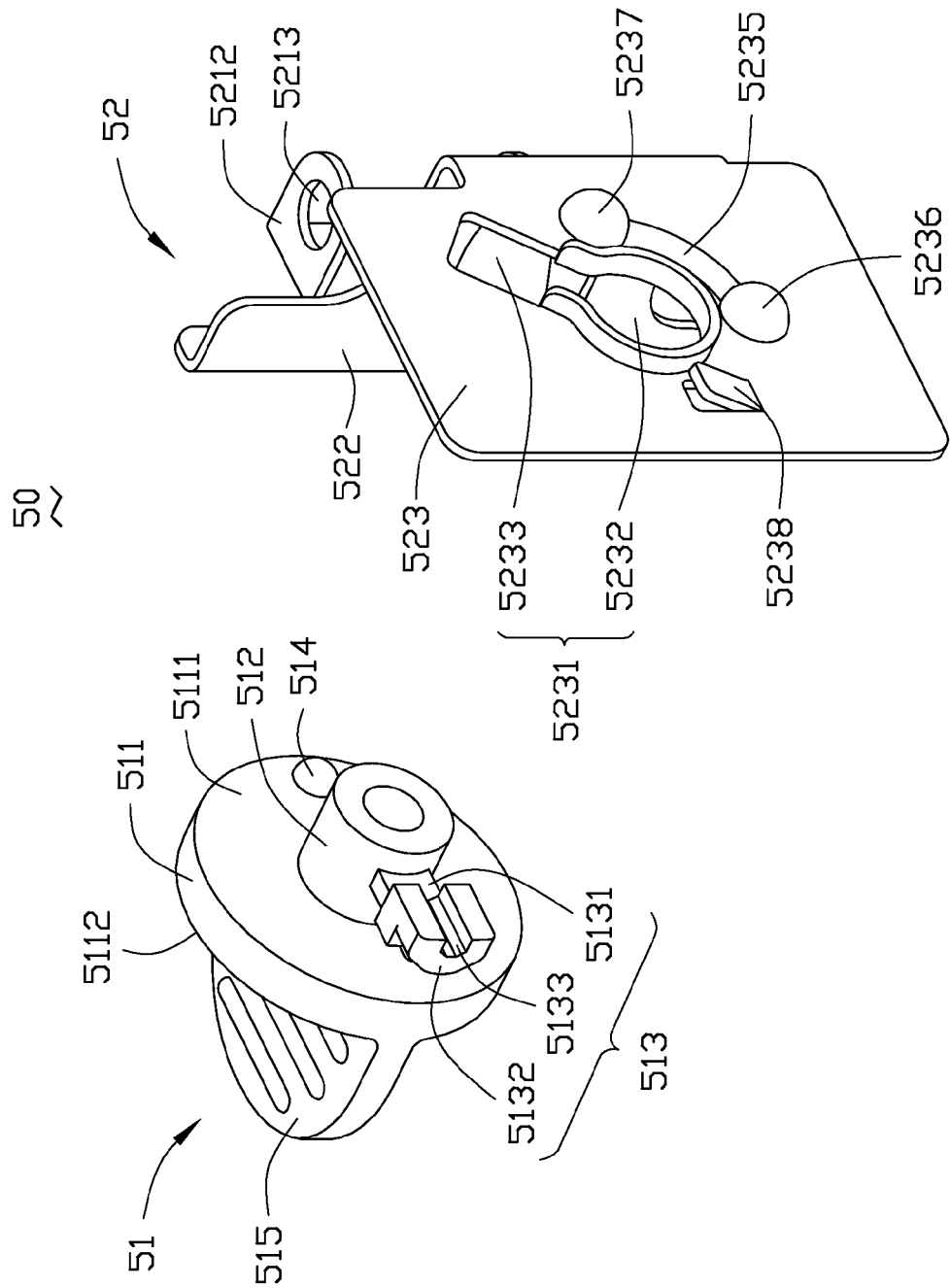
FIG. 3 is an exploded, isometric view of a securing member of FIG. 1.
Figure 4:
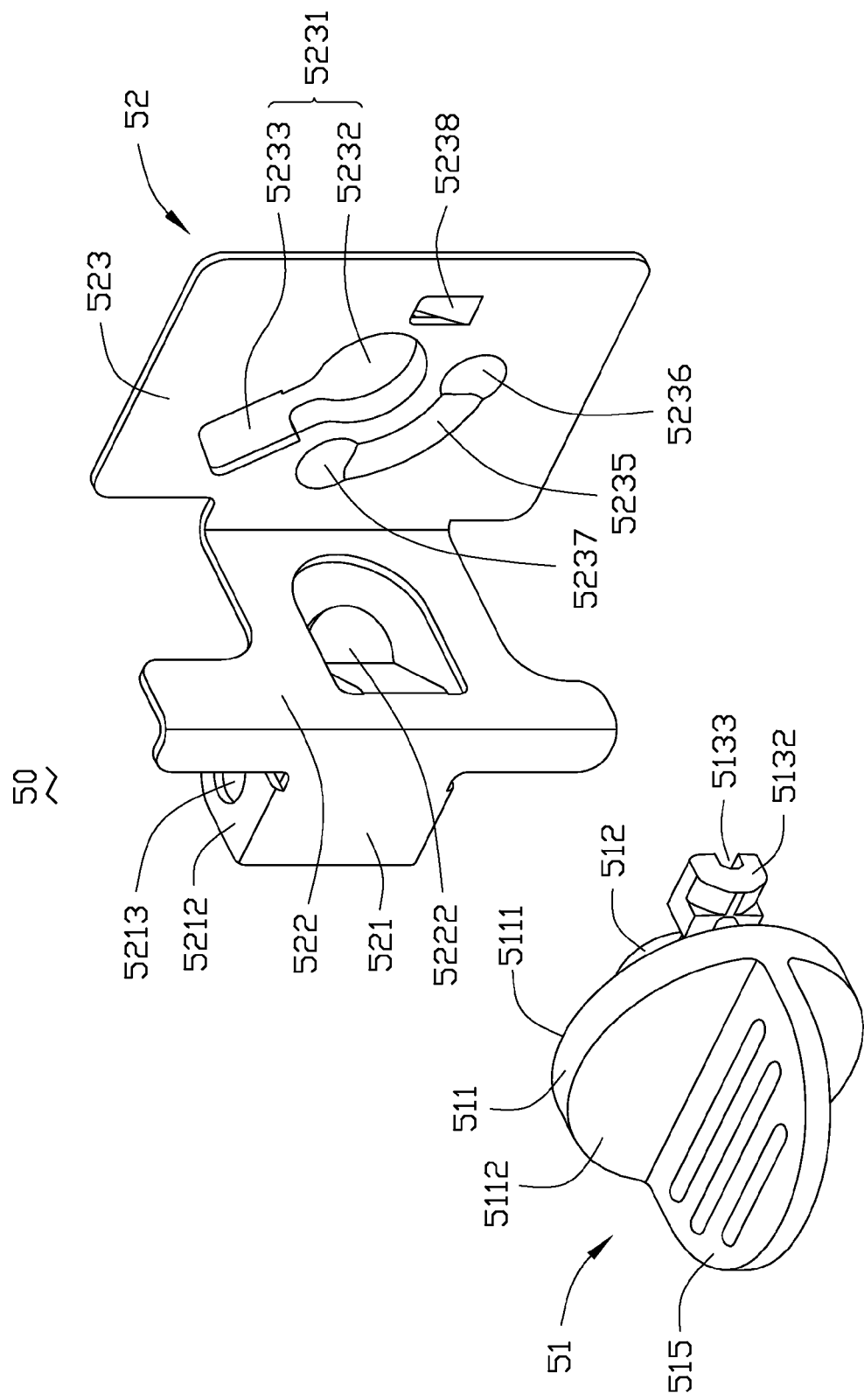
FIG. 4 is similar to FIG. 3, but viewed from another aspect.
Figure 5:
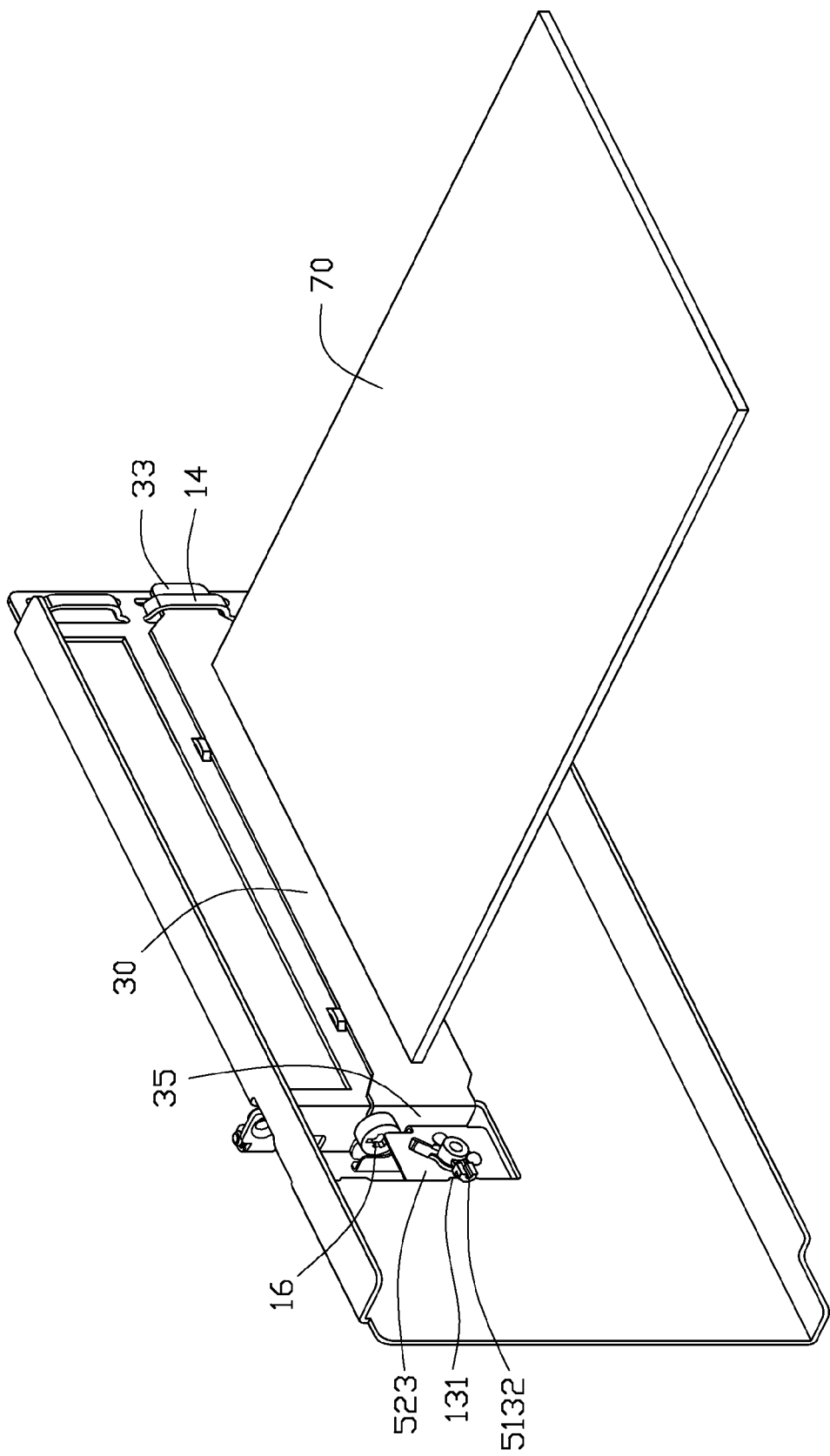
FIG. 5 is an assembly view of FIG. 1.
Figure 6:
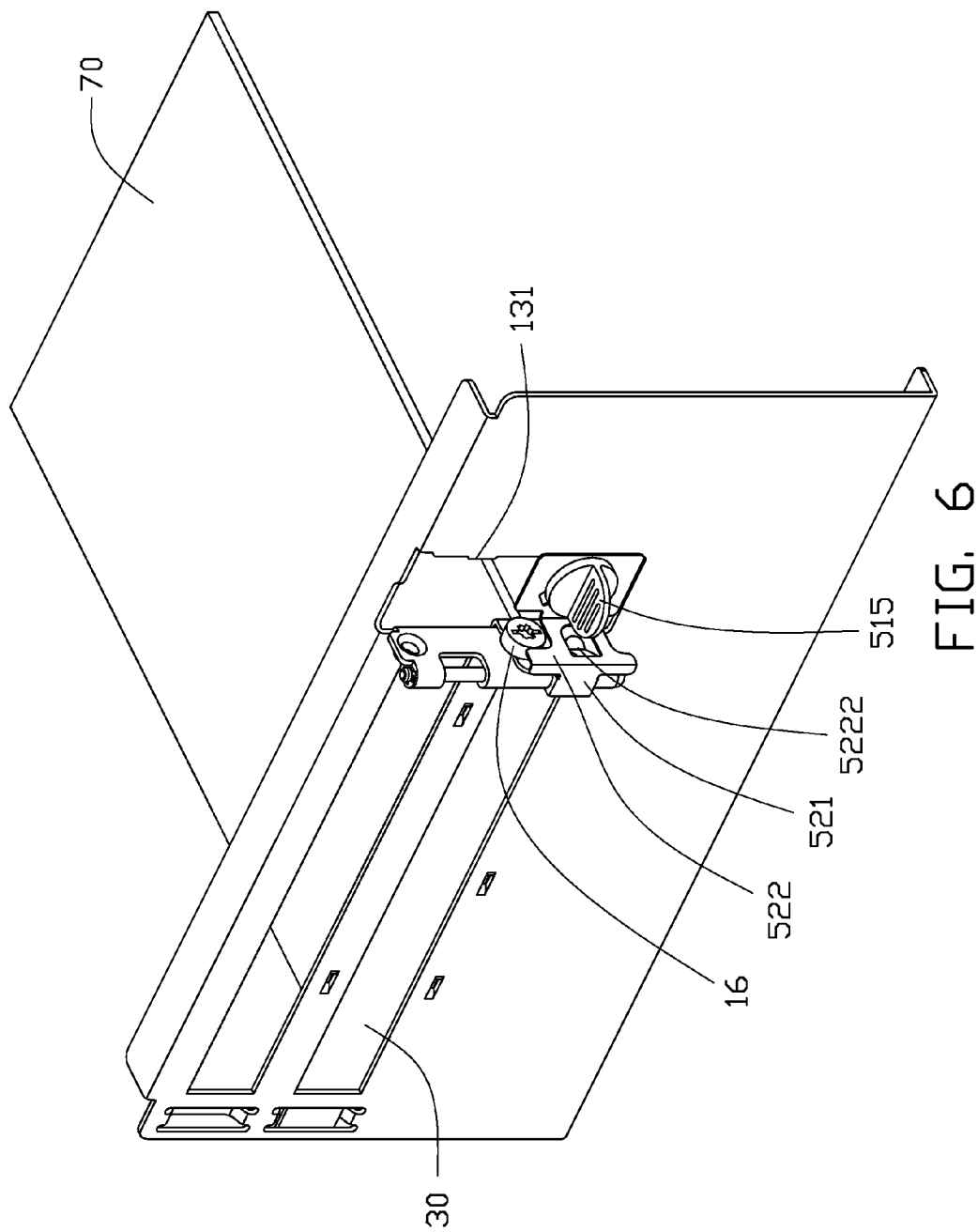
FIG. 6 is similar to FIG. 5, but viewed from another aspect.

Referring to FIGS. 3 and 4, the securing member 50 includes a securing piece 51 and a pressing piece 52.

The securing piece 51 includes a body portion 511. The body portion 511 defines a first side surface 5111 and a second side surface 5112 opposite to the first side surface 5111. A columniform axis portion 512 protrudes perpendicularly from the first side surface 5111. A securing portion 513 extends perpendicularly from the axis portion 512. The securing portion 513 includes a narrower portion 5131 connected to the axis portion 512 and a broader portion 5132 extending from the narrower portion 5131. The broader portion 5132 defines a slot 5133 perpendicular to the first side surface 5111. A rounded protrusion 514 protrudes from the first side surface 5111. A semicircular holding portion 515 protrudes from the second side surface 5112.

The pressing piece 52 includes a pivoting portion 521, a pressing portion 522, and a mounting portion 523. The pressing portion 522 extends from the pivoting portion 521 and the mounting portion 523 extends from the pressing portion 522.

The pivoting portion 521 includes a body 5211 and two pivoting tabs 5212 bent from two opposite sides of the body 5211. Each pivoting tab 5212 defines a second pivoting hole 5213.

An elastic tab 5222 protrudes out from the pressing portion 522 configured to resist elastically on the mounting end 35 of the mounting piece 30.

The mounting portion 523 defines an opening 5231. The opening 5231 defines a pivoting hole 5232 corresponding to the axis portion 512 and an extending cutout 5233 connected to the pivoting hole 5232 corresponding to the securing portion 513. An arc-shaped sliding slot 5235 is adjacent to the opening 5231 and allows the protrusion 514 to slide along the sliding slot 5235. The sliding slot 5235 defines a first end 5236 and a second end 5237. A stopping tab 5238 protrudes out from the mounting portion 523 adjacent to the opening 5231. The stopping tab 5238 is configured to prevent the securing portion 513 from moving when the securing portion 513 moves to abut the inside surface of the mounting bracket 10.

Referring to FIGS. 1 to 6, in assembly, the elongated rectangular base 31 of the mounting piece 30 covers the corresponding elongated rectangular slot 12. The inserting end 33 of the mounting piece 30 is inserted in the securing slots 141 and the mounting end 35 of the mounting piece 30 abuts the blocking plate 15 via the mounting opening 13. The positioning protrusion 16 is received in the cutout 351 of the mounting piece 30. The pivoting portion 521 of the pressing piece 52 is received in the receiving notch 19 of the blocking plate 15. A pivoting fastener 60 is inserted in the first pivoting holes 181 and the second pivoting holes 5213 to pivotably attach the pressing piece 52 to the blocking plate 15. Then, the axis portion 512 and the securing portion 513 of the securing piece 51 passes through the opening 5231. The protrusion 514 of the securing piece 51 is disposed in the first end 5236 of the sliding slot 5235. The securing piece 51 is pivoted to enable the broader portion 5132 of the securing portion 513 to abut the inside surface of the blocking tab 131 by holding the holding portion 515, thereby securing the pressing piece 52 on the mounting bracket 10. At this time, the protrusion 514 of the securing piece 51 slides to the second end 5237 of the sliding slot 5235. The elastic tab 5222 abuts the mounting end 35 of the mounting piece 30.

In disassembly, the securing piece 51 is pivoted to drive the broader portion 5132 of the securing portion 513 apart from the inside surface of the blocking tab 131 via holding the holding portion 515. The pressing piece 52 is pulled outwardly to enable the pressing portion 522 to move away from the mounting end 35 of the mounting piece 30. Thus, the PCI card 70 can be easily removed from the mounting bracket 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for a PCI card, comprising:
a mounting bracket having a base and a blocking plate perpendicular to the base;
a mounting piece adapted to attach the PCI card to the mounting bracket, the mounting piece comprising a mounting end; and
a securing member comprising a pressing piece and a securing piece; the pressing piece comprising a first pivoting portion, a pressing portion extending from the first pivoting portion, and a mounting portion extending from the pressing portion; the first pivoting portion pivotally mounted to the blocking plate; the securing piece rotatably attached to the mounting portion; the securing piece comprising a securing portion, and the securing portion engaging with an inside surface of the mounting bracket by rotating the securing piece relative to the pressing piece, thereby enabling the mounting end of the mounting piece to be sandwiched between the blocking plate and the pressing portion.

2. The mounting apparatus for a PCI card of claim 1, wherein the securing piece comprises a body portion, an axis portion protruding from the body portion, and a holding portion extending from the body portion; and the mounting porting defines an opening corresponding the axis portion, the axis portion being connected to the securing portion, and the holding portion configured to drive the securing portion to move to engage with the mounting bracket.

3. The mounting apparatus for a PCI card of claim 2, wherein the securing piece further comprises a protrusion protruding from the body portion, and the mounting portion defines a sliding slot that allows the protrusion to slide in the sliding slot if the body portion is pivoted.

4. The mounting apparatus for a PCI card of claim 2, wherein the opening defines a pivoting hole, corresponding to the axis portion, and an extending cutout, corresponding to the securing portion.

5. The mounting apparatus for a PCI card of claim 2, wherein the axis portion and the holding portion are disposed on opposite sides of the body portion.

6. The mounting apparatus for a PCI card of claim 2, wherein the securing portion comprises a narrower portion, connected to the axis portion, and a broader portion, extending from the narrower portion and abutting the inside surface of the mounting bracket.

7. The mounting apparatus for a PCI card of claim 1, wherein the mounting portion abuts an outside surface of the mounting bracket.

8. The mounting apparatus for a PCI card of claim 1, wherein the first pivoting portion comprises a body and two pivoting tabs extending from two opposite sides of the body, each tab defining a pivoting hole; and the blocking plate comprises a second pivoting portion, and the second pivoting portion defines a second pivoting hole corresponding to the first pivoting hole.

9. The mounting apparatus for a PCI card of claim 1, wherein the pressing portion comprises an elastic tab abutting against the mounting end of the mounting piece.

10. The mounting apparatus for a PCI card of claim 1, wherein the pressing piece comprises a stopping tab configured to prevent the securing portion from further rotation.

11. A mounting apparatus for a PCI card, comprising:
a mounting bracket defining a slot, the mounting bracket comprising a blocking plate adjacent to the slot;
a mounting piece adapted to attach the PCI card to the mounting bracket, the mounting piece comprising a base and a mounting end extending from the base, the base covering the slot, the mounting end abutting the blocking plate of the mounting bracket; and
a securing member comprising a pressing piece and a securing piece; the pressing piece comprising a first pivoting portion, a pressing portion extending from the first pivoting portion, and a mounting portion extending from the pressing portion; the first pivoting portion pivotally mounted to the blocking plate; the securing piece rotatably attached to the mounting portion; the securing piece engaging with the mounting bracket by rotating the securing piece relative to the pressing piece, thereby enabling the mounting end of the mounting piece to be sandwiched between the blocking plate and the pressing portion.

12. The mounting apparatus for a PCI card of claim 11, wherein the securing piece comprises a body portion, an axis portion protruding from the body portion, a securing portion extending from the axis portion, and a holding portion extending from the body portion; and the mounting porting defines an opening corresponding the axis portion, the axis portion being connected to the securing portion, and the holding portion configured to drive the securing portion to move to engage with the mounting bracket.

13. The mounting apparatus for a PCI card of claim 12, wherein the securing piece further comprises a protrusion protruding from the body portion, and the mounting portion defines a sliding slot that allows the protrusion to slide in the sliding slot if the body portion is pivoted.

14. The mounting apparatus for a PCI card of claim 12, wherein the securing portion comprises a narrower portion, connected to the axis portion and a broader portion, extending from the narrower portion and abutting an inside surface of the mounting bracket.

15. The mounting apparatus for a PCI card of claim 12, wherein the axis portion and the holding portion are disposed on opposite sides of the body portion.

16. The mounting apparatus for a PCI card of claim 11, wherein the first pivoting portion comprises a body and two pivoting tabs extending from opposite sides of the body; each tab defining a pivoting hole; and the blocking plate comprises a second pivoting portion, and the second pivoting portion defines a second pivoting hole corresponding to the first pivoting hole.

17. The mounting apparatus for a PCI card of claim 11, wherein the pressing portion comprises an elastic tab abutting against the mounting end of the securing piece.

18. The mounting apparatus for a PCI card of claim 11, wherein the pressing piece comprises a stopping tab configured to prevent the securing piece from further rotation.

* * * * *